D. A. BURNS.
COUPLING ATTACHMENT.
APPLICATION FILED JAN. 26, 1918.
1,268,320.
Patented June 4, 1918.
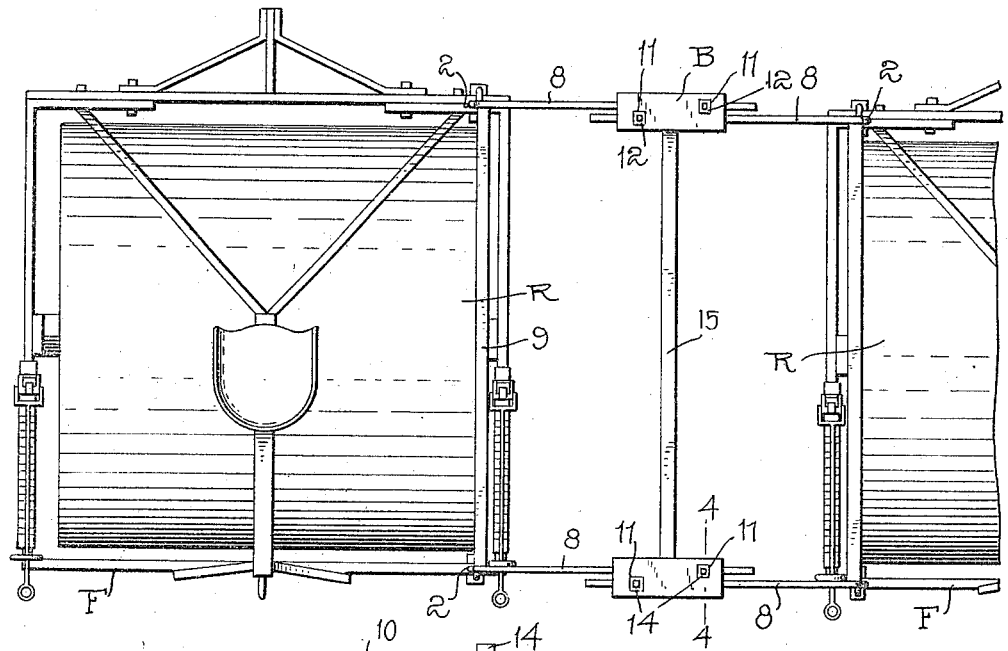
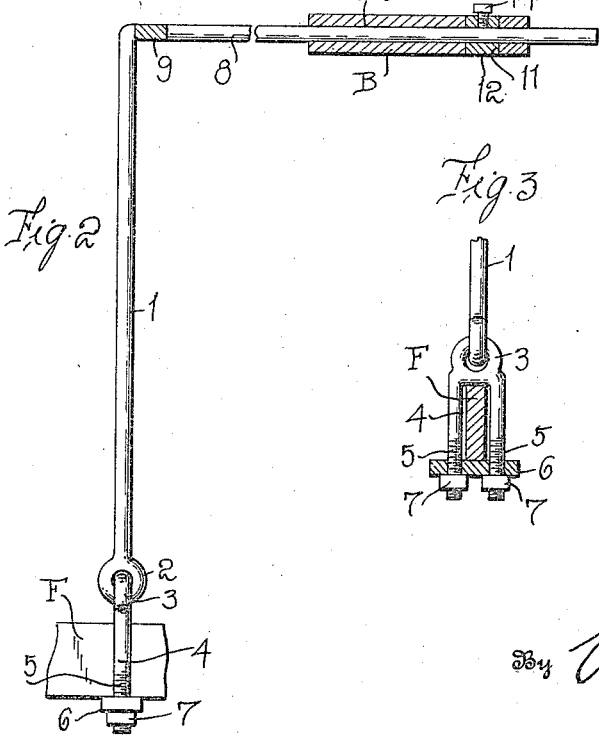
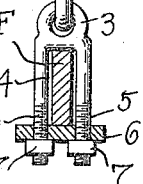
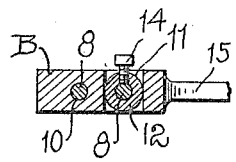
Inventor
D. A. BURNS
By Watson E. Coleman
Attorney

UNITED STATES PATENT OFFICE.

DOMER A. BURNS, OF MILLER, ARKANSAS.

COUPLING ATTACHMENT.

1,268,320.

Specification of Letters Patent.  Patented June 4, 1918.

Application filed January 26, 1918. Serial No. 213,916.

*To all whom it may concern:*

Be it known that I, DOMER A. BURNS, a citizen of the United States, residing at Miller, in the county of Cleburne and State of Arkansas, have invented certain new and useful Improvements in Coupling Attachments, of which the following is a specification, reference being had to the accompanying drawings.

This invention relates to certain improvements in coupling attachments and has relation more particularly to a device of this general character especially designed and adapted for use in connection with agricultural implements whereby such devices may be readily assembled in gang as the occasion of practice may require.

The invention also has for an object to provide a novel and improved coupling attachment of this general character which is assembled in a manner to regulate or vary the space between coacting devices.

The invention consists in the details of construction and in the combination and arrangement of the several parts of my improved coupling attachment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan illustrating a coupling attachment constructed in accordance with an embodiment of my invention and in applied position;

Fig. 2 is an enlarged fragmentary view partly in elevation and partly in section illustrating certain features of my improved attachment;

Fig. 3 is a fragmentary view partly in elevation and partly in section illustrating in detail one of the connections of my improved attachment with the frame of an implement; and Fig. 4 is an enlarged sectional view taken substantially on the line 4—4 of Fig. 1.

As disclosed in the accompanying drawings the frames F for the rollers R are of substantially the same construction as particularly set forth in my co-pending application, Serial No. 208371, filed December 22, 1917.

When it is desired, as on large plantations, to employ the rollers R in gang, the frames F are arranged in transverse alinement as indicated in Fig. 1 and said frames are maintained by my improved coupling attachment to be hereinafter particularly described. Each of the frames F is adapted to have its separate draft team.

My improved coupling attachment comprises two substantially duplicate members and each of said members comprises parallel end members 1 of predetermined length and adapted to extend upwardly from the inner side portion of the frame F when in applied position. The lower portion of each of the end members 1 is provided with an eye 2 loosely engaged with an eye member 3 carried by the intermediate portion of a substantially U-shape clamping member 4. The clamping member 4 straddles from above as herein embodied, an end beam of the frame F and has the free extremities of its arms threaded as at 5 and disposed through the extremities of the plate 6 underlying the end member of the frame F. Engaged with the threaded extremities 5 of the clamping member 4 are the holding nuts 7 contacting with the under face of the plates 6 and whereby the member 4 is effectively maintained in applied position upon the frame F.

The outer or opposite end portions of the members 1 are provided with the rectangular extensions 8 of desired lengths and the inner end portions of the members 8 are tied or connected by the interposed rigid member or strip 9 which serves to maintain the members 1 of a section in predetermined spaced relation. When in applied position the extensions 8 extend laterally beyond the adjacent side of the frame F and are of a length to overlap the outer or free end portions of the extensions 8 of the second section as is clearly illustrated in Fig. 1. The free end portions of each pair of reversely directed extensions 8 are disposed through a block B and are capable of endwise movement therethrough. Each of the bores or passageways 10 in the block through which the extension 8 is directed, is intersected by an opening 11 in which is arranged a sleeve 12 through which an extension 8 is directed. Threaded through the sleeve 12 is the binding screw 14 engageable with the extension 8. Through the medium of the sleeves 12 and the binding screws 14 it will be at once self-evident that the extensions 8 may be adjusted longitudinally through the blocks B so that adjacent frames F may be spaced apart at varying distance as necessitated by the requirements of practice as the binding members or screws 14 will hold the extensions 8 against movement through the sleeves 12 and as the sleeves 12 snugly fit within the openings 11, the blocks B serve to effectively hold the extensions 8 in the relative adjustments.

It will also be understood that my improved coupling attachment also possesses a decided advantage afforded by the particular means whereby the members 1 are engaged with the frames F as such connection readily permits an independent swinging movement of the frames to compensate for the various inequalities in the surface over which the rollers or other implements traverse, when assembled in gang.

Interposed between and secured to the blocks B is the rigid member or arm 15 which serves to maintain the blocks B in a fixed spaced relation.

From the foregoing description, it is thought to be obvious that a coupling attachment constructed in accordance with my invention is particularly well adapted for use by reason of the convenience and facility with which it may be assembled and operated and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. In combination with bodies arranged side by side in spaced relation, a coupling attachment for adjacent bodies comprising two substantially duplicate sections, each of said sections consisting of elongated members pivotally engaged at their lower extremities with a frame, the opposite extremities of the members being provided with laterally directed extensions, the extensions of one section overlapping the extensions of the adjacent section, a rigid member connecting the inner end portions of the extensions of each of the sections, blocks through which the extensions of the sections are adjustably disposed, means for holding said extensions against movement relative to the blocks, and a rigid member connecting the blocks.

2. In combination with bodies arranged side by side in spaced relation, a coupling attachment for adjacent bodies comprising two substantially duplicate sections, each of said sections consisting of elongated members pivotally engaged at their lower extremities with a frame, the opposite extremities of the members being provided with laterally directed extensions, the extensions of one section overlapping the extensions of the adjacent section, a rigid member connecting the extensions of each of the sections, blocks through which the extensions of the sections are adjustably disposed, and means for holding said extensions against movement relative to the blocks.

3. In combination with bodies arranged side by side in spaced relation, a coupling attachment for adjacent bodies comprising two substantially duplicate sections, each of said sections consisting of elongated members pivotally engaged at their lower extremities with a frame, the opposite extremities of the members being provided with laterally directed extensions, the extensions of one section overlapping the extensions of the adjacent section, a rigid member connecting the inner end portions of the extensions of each of the sections, blocks through which the extensions of the sections are adjustably disposed, means for holding said extensions against movement relative to the blocks, and means coacting with the blocks for maintaining the same in a fixed relative relation.

In testimony whereof I hereunto affix my signature in the presence of two witnesses.

DOMER A. BURNS.

Witnesses:
D. B. BAILEY,
A. O. DAVIS.

Copies of this patent may be obtained for five cents each, by addressing the "Commissioner of Patents, Washington, D. C."